United States Patent [19]

Yamada et al.

[11] Patent Number: 5,559,609
[45] Date of Patent: Sep. 24, 1996

[54] FACSIMILE TRANSCEIVER

[75] Inventors: Hiroyuki Yamada, Nagano-ken; Minoru Ichimura; Takashi Naito, both of Saku, all of Japan

[73] Assignee: Matsushita Graphic Communication Systems, Inc., Tokyo, Japan

[21] Appl. No.: 272,984

[22] Filed: Jul. 15, 1994

[30] Foreign Application Priority Data

Jul. 30, 1993 [JP] Japan ................... 5-190022
Aug. 2, 1993 [JP] Japan ................... 5-191113

[51] Int. Cl.6 .................................. H04N 1/00
[52] U.S. Cl. .................. 358/400; 358/496; 358/498
[58] Field of Search .......................... 358/498, 496, 358/400, 401; 355/308; 347/104

[56] References Cited

U.S. PATENT DOCUMENTS

| | | | |
|---|---|---|---|
| 4,651,224 | 3/1987 | Watanabe | 358/498 |
| 4,908,719 | 3/1990 | Nonoyama | 358/496 |
| 4,969,048 | 11/1990 | Hoshino | 358/496 |
| 4,975,787 | 12/1990 | Ijvin et al. | 358/496 |
| 5,138,463 | 8/1992 | Morimoto et al. | 358/496 |
| 5,278,677 | 1/1994 | Lee et al. | 358/496 |
| 5,337,165 | 8/1994 | Riousset et al. | 358/496 |
| 5,339,139 | 8/1994 | Fullerton et al. | 355/308 |
| 5,377,250 | 7/1994 | Ikeda | 358/400 |
| 5,387,980 | 2/1995 | Baitz et al. | 358/496 |
| 5,390,016 | 2/1995 | Hoshi et al. | 355/308 |
| 5,412,462 | 5/1995 | Matsuo et al. | 355/308 |

FOREIGN PATENT DOCUMENTS

| | | | |
|---|---|---|---|
| 0131721 | 11/1978 | Japan | 358/498 |
| 0075769 | 6/1981 | Japan | 358/498 |
| 0154967 | 9/1982 | Japan | 358/498 |

*Primary Examiner*—Edward L. Coles, Sr.
*Assistant Examiner*—Thomas L. Stoll
*Attorney, Agent, or Firm*—Lowe, Price, LeBlanc & Becker

[57] ABSTRACT

A facsimile transceiver is provided which includes a housing body, a paper cassette for storing therein a stack of recording paper sheets, a printer for printing images on the recording paper sheets, a recorded image outlet formed in an upper surface of the housing body, a paper feeder for feeding the recording paper sheets in sequence to the recorded image outlet through the printer along a feeding path extending from the paper cassette disposed on the bottom of the housing body to the recorded image outlet through a front side of the housing body, and a front cover openable to expose the feeding path for maintenance thereof.

13 Claims, 5 Drawing Sheets

– 5,559,609 –

FACSIMILE TRANSCEIVER

BACKGROUND OF THE INVENTION

1. Technical Field of the Invention

The present invention relates generally to a facsimile transceiver, and more particularly to an improved structure of a facsimile transceiver which is designed to provide a user with ease of maintenance of a paper feeding path.

2. Background Art

In recent yeas, laser printer type facsimile transceivers which prints recorded images on regular sheets of printing paper, have become used widely.

FIG. 5 shows a conventional laser printer type facsimile transceiver. This facsimile transceiver includes generally a housing body 101, a recording paper cassette 102 in which sheets of recording paper are stacked, a pick up roller 103 for picking the sheets of recording paper up to a recording station, recording paper feeding rollers 104 for feeding the sheets of recording paper along a recording paper feeding path C through the recording station to a recording paper ejecting tray 105, and a recording station cover 106. When the recording paper is jammed in the feeding path C, a facsimile operator may open the recording station cover 106 around a support shaft 107 for removing the jammed recording paper.

The facsimile machine further includes a document feeder tray 108, a guide roller 109, a supply roller 110, a separating plate 111, feeding rollers 112. The guide roller 109 guides documents placed on the document feeder tray 108 sequentially from the lowermost sheet thereof to the supply roller 110. The separating plate 111 presses the upper surface of the documents on the guide roller 109, while the supply roller rotates in contact with an leading edge of the lowermost sheet of the documents guided by the guide roller 109 to sequentially feed them forward. The feeding rollers 112 are mounted on the housing body 101 and urges pinch rollers 113 under a constant pressure to establish tight engagement therebetween. The feeding rollers 112 and the pinch rollers 113 are arranged adjacent the center line of a document feeding path B. The feeding rollers 112 rotate while holding the document between same and the pinch rollers 113 to advance it through an image reading system 114 to a document ejecting tray 115. The pinch rollers 113 are supported by a reading station cover 116. The reading station cover 116 has the separating plate 111 disposed thereon adjacent a document inlet. When the document is jammed in the document feeding path B, the facsimile operator may open the reading station cover 116 around a support shaft 117 for removal of the jammed document. A latch 118 is provided on the reading station cover 116 near the document inlet and holds the recording station cover 116 on the housing body 101.

In a record mode of operation, one sheet of recording paper is picked up by the pick up roller 103 from the recording paper cassette 102. Images are then printed on the recording paper while carried by the feeding rollers 104 along the recording paper feeding path C. During the recording operation, when the recording paper is jammed in the recording paper feeding path C, the facsimile operator first removes the recording paper ejecting tray 105 from the side of the housing body 101 to provide a space required for opening the recording station cover 106. When the recording station cover 106 is opened, the recording paper feeding path C will be exposed so that the facsimile operator can remove the jammed recording paper therefrom. After removal of the jammed recording paper, the recording station cover 106 is returned to its closed position and then the recording paper ejecting tray 105 is set to the housing body 101 again. Afterwards, the recording operation is resumed.

In a reading mode of operation, some lower sheets of documents stacked on the document tray 108 are advanced by the guide roller 109 to the supply roller 110. Upon reaching the supply roller 110, the documents are pressed downward by the separating plate 111. The supply roller 110 rotates in engagement with the lowermost sheet of the documents to supply them sequentially in ascending order. The document supplied by the supply roller 110 is held between the feeding rollers 112 and the pinch rollers 113 and images printed thereon is read by the image reading system 114. During the reading operation, when the document is jammed in the document feeding path B, the facsimile operator may release the latch 118 to open the reading station cover 116 for exposing the document feeding path B. After removal of the jammed document, the reading station cover 116 is closed and then the latch 118 is hooked on a pin (not shown) secured on the housing body 101. Afterwards, the reading operation is resumed.

The above prior art facsimile machine however, has faced the following difficulties. First, the facsimile operator, when away from the facsimile machine, cannot visually perceive facsimile reception easily since the recording paper ejecting tray 105 is arranged beneath the document paper ejecting tray 115. Additionally, since the recording paper ejecting tray 105 and the recording station cover 106 are both arranged on the side wall of the housing body 101, opening the recording station cover 106 requires removing the document paper ejecting tray 115 and the recording paper ejecting tray 105 to keep a space corresponding to the size of the recording station cover 106 on the side of the housing body 101. This wastes considerable time of the operator.

Moreover, component parts of the image reading system 114 such as mirrors, lenses, and photosensitive element are mounted independently in the housing body 101, and angular adjustment and positioning thereof are required during assembly of the image reading system 114, therefore, it is difficult to assemble the image reading system 114 simultaneously with assemble of the housing body 101. The assembly of the image reading system 114 must be performed after completion of the assembly of the housing body 101. A great deal of time is therefore, consumed in assembling the whole of the facsimile transceiver.

SUMMARY OF THE INVENTION

It is therefore a principal object of the present invention to avoid the disadvantages of the prior art.

It is another object of the present invention to provide a compact structure of a facsimile transceiver which is designed to offer easy perception of whether facsimile information has been received or not even when a facsimile operator is away from the facsimile transceiver.

It is a further object of the present invention to provide an improved structure of a facsimile transceiver which provides for ease of maintenance of a paper feeding path when a sheet of paper is jammed therein.

It is a still further object of the present invention to provide an improved structure of a facsimile transceiver which is capable of assembling an image reading system concurrent with assembly of a main body of the facsimile transceiver.

According to one aspect of the present invention, there is provided a facsimile apparatus which comprises a housing body, a paper storage member for storing therein a stack of recording paper sheets, said paper storage member being arranged on a bottom of said housing body, a printing means for printing an image on the recording paper sheet, a recorded image outlet formed in an upper surface of said housing body, and a paper feeding means for feeding the recording paper sheets, in sequence, to said recorded image outlet through said printing means along a feeding path extending from said paper storage member to said recorded image outlet through a front side of said housing body.

According to another aspect of the present invention, there is provided a facsimile apparatus which comprises a housing body, a paper storage member for storing therein a stack of recording paper sheets, said paper storage member being arranged on a bottom of said housing body detachably from a front side of said housing body, a printing means for printing an image on the recording paper sheet, a recorded image outlet formed in an upper surface of said housing body, a paper feeding means for feeding the recording paper sheets, in sequence, to said recorded image outlet through said printing means along a feeding path extending from said paper storage member to said recorded image outlet through the front side of said housing body, and a front cover member arranged to be opened to expose the feeding path.

According to a further aspect of the invention, there is provided a facsimile apparatus which comprises a housing body, a paper storage member for storing therein a stack of recording paper sheets, said paper storage member being arranged on a bottom of said housing body, a printing means for printing an image on the recording paper sheet, a recorded image outlet formed in an upper surface of said housing body, a paper feeding means for feeding the recording paper sheets, in sequence, to said recorded image outlet through said printing means along a feeding path extending from said paper storage member to said recorded image outlet through a front side of said housing body, and a reading means for reading contents of a document, said reading means being arranged above said printing means.

In the preferred mode, a document inlet, a document outlet, and a U-shaped document feeding path may be provided. The document inlet is formed in the upper surface of the housing body for introducing the document into the housing body. The document outlet is formed in a rear surface of the housing body for ejecting the document outside the housing body. The U-shaped document feeding path extending from the document inlet to the document outlet through the reading means.

The printing means is provided with a printer module disposed in a printer housing arranged on the paper storage member. The printer housing has an upper wall extending to the rear surface of the housing body. The document outlet is defined between the upper wall of the printer housing and the reading means and is so designed as to widen as approaching a downstream side of the U-shaped document feeding path.

The U-shaped document feeding path has a portion downstream of a center line thereof greater in radius than a portion upstream of the center line.

The reading means is provided with an optical system having an optical axis. The optical system is so arranged opposite the printing means across the document feeding path that the optical axis may be oriented at a given angle to the bottom of the housing body.

The optical system is disposed in an optical system housing having a bottom wall. The document outlet may be defined between the upper wall of the printer housing and the bottom wall of the optical system housing. The optical system housing is so arranged that the bottom wall thereof may be inclined to the upper wall of the printer housing at a predetermined angle to widen the document outlet as approaching the downstream side of the document feeding path.

The optical system is arranged inside the U-shaped document feeding path and has its optical axis inclined to the upper wall of the printer housing at a preselected angle. A document supplying roller for supplying a document to the reading means is located at a preselected distance away from an upper wall of a housing of the reading means in a direction perpendicular to the upper wall of the housing.

According to a still further aspect of the invention, there is provided a facsimile apparatus which comprises a housing body, a paper storage member for storing therein a stack of recording paper sheets, said paper storage member being arranged on a bottom of said housing body, a printing means for printing an image on the recording paper sheet, said printing means being arranged on a front side of said housing body, a recorded image outlet formed in an upper surface of said housing body, a paper feeding means for feeding the recording paper sheets in sequence to said recorded image outlet through said printing means along a feeding path extending from said paper storage member to said recorded image outlet through the front side of said housing body, and a reading means for reading contents of a document, said reading means being arranged on a rear side of said housing body and above said printing means.

According to a yet further aspect of the invention, there is provided a facsimile apparatus which comprises a housing body, a paper storage member for storing therein a stack of recording paper sheets, said paper storage member being arranged on a bottom of said housing body, a printing means for printing an image on the recording paper sheet, a recorded image outlet formed in an upper surface of said housing body, a feeding path for guiding feeding of the recording paper sheets in sequence to said recorded image outlet through said printing means, said feeding path extending from said paper storage member to said recorded image outlet through a front side of said housing body, a reading means for reading contents of a document, a document inlet formed in the upper surface of said housing body for introducing the document into said housing body, a document outlet formed in a rear surface of said housing body for ejecting the document outside said housing body, and a U-shaped document feeding path extending from said document inlet to said document outlet through said reading means.

According to a still further aspect of the invention, there is provided a facsimile apparatus which comprises a housing body, a paper storage member for storing therein a stack of recording paper sheets, said paper storage member being arranged on a bottom wall of said housing body, a printing means for printing an image on the recording paper sheet, an image-printed paper tray for storing the image-printed recording paper sheet, said image-printed paper tray projecting from an upper wall of said housing body, a front cover member for covering a front portion of the facsimile apparatus, and a paper feeding means for sequentially feeding the recording paper sheets to said image-printed paper tray through said printing means along a feeding path extending from said paper storage member to said image-printed paper tray so as to be exposed when said front cover is opened.

In the preferred mode, said image-printed paper tray is arranged so as to have the image-printed recording paper sheet face forward of said housing body.

A document feeder tray may be mounted on the upper wall of said housing body. A reading means may be prodded for reading contents of a document fed from said document feeder tray. The document feeder tray is arranged behind said image-printed paper tray.

A transmitted document tray may be mounted on a rear wall of said housing body. A U-shaped document feeding path may be provided which extends from said document feeder tray to said transmitted document tray through said reading means.

The reading means is arranged opposite said printing means across said U-shaped document feeding path.

A document feeding means may be provided for feeding the document along a document feeding path extending from said document feeder tray to said reading means. A reading means cover member may be arranged to expose said reading means and the document feeding means.

A document supplying means may further be provided for supplying the document from said document feeder tray to said document feeding means. A document supplying means cover may also provided for covering said document supplying means.

The document feeding means includes a document feeding roller arranged along the document feeding path. The reading means cover is held by the document supplying means cover through a latch which is provided on a portion of the document supplying means cover facing the document feeding roller.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
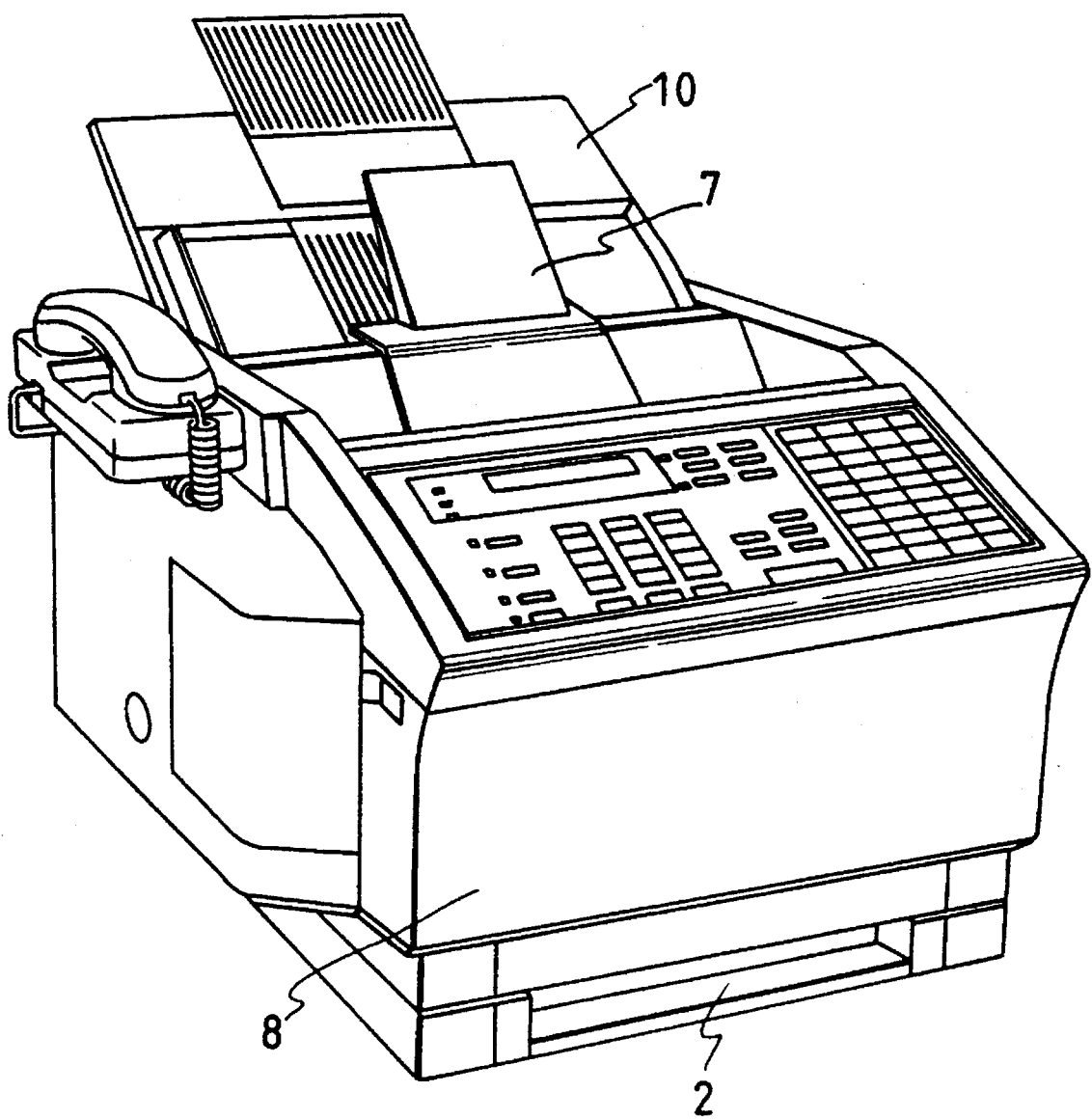
FIG. 1 is a perspective view which shows a facsimile transceiver according to the present invention.
Figure 2:
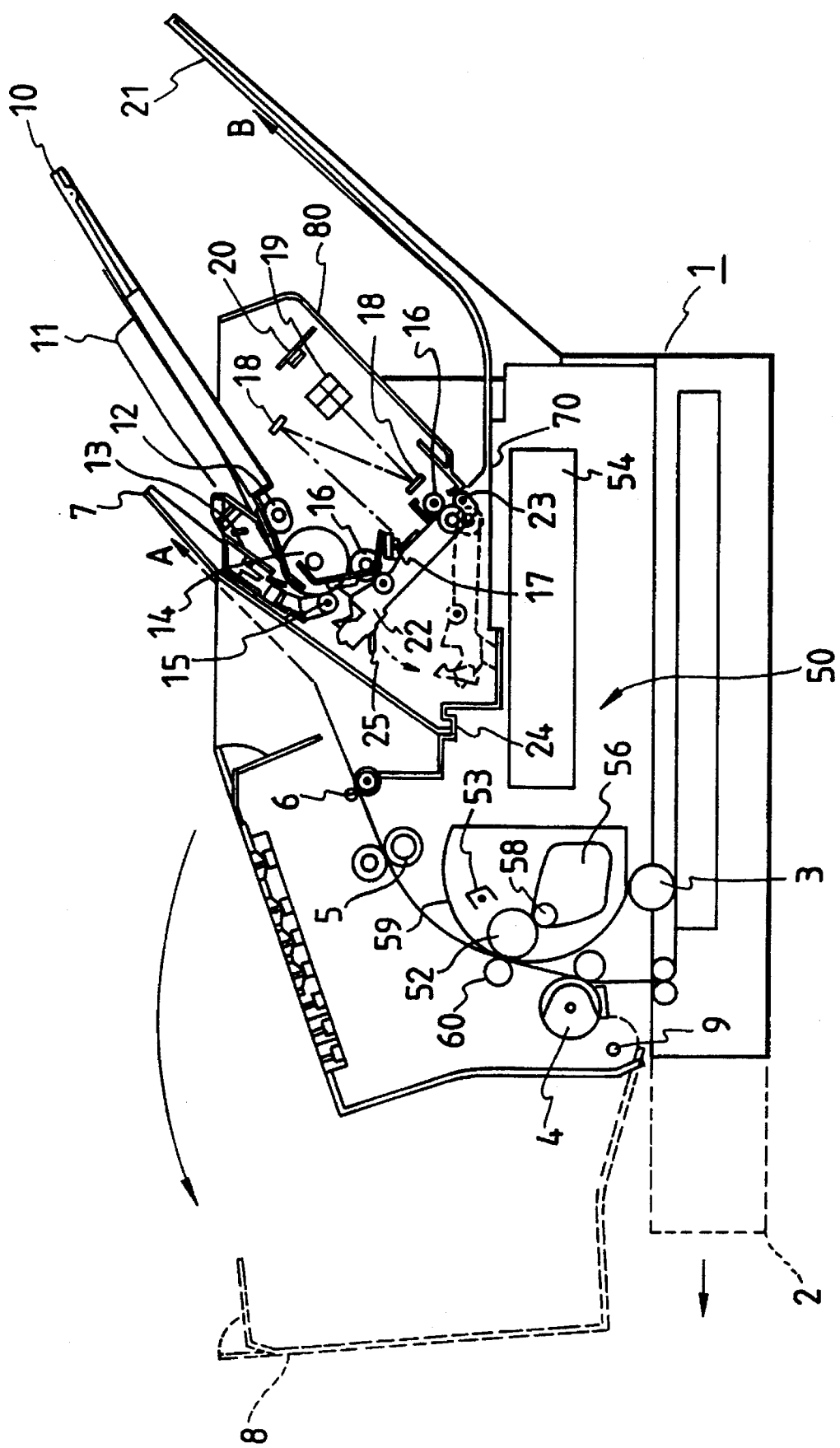
FIG. 2 is a cross-sectional view which shows an internal structure of a facsimile transceiver of the invention.

Referring now to the drawings, wherein like numbers refer to like parts in several views, particularly to FIGS. 1 and 2, there is shown a facsimile transceiver according to the present invention.

The facsimile transceiver includes generally a housing body 1, a recording sheet cassette 2, a front openable cover 8, a document feeder tray 10, and a transmitted document tray 21.

The recording sheet cassette 2 is arranged on the bottom of the housing body 1 detachably from the front. In the recording sheet cassette 2, sheets of regular paper (i.e., recording paper sheets) are stacked. The recording paper sheets are sequentially introduced by a pick-up roller 3 to a recording paper feeding path A and then advanced by a feeding roller 4 toward an image recording system 50. In the image recording system 50, an image is developed on the recording paper sheet using known developing techniques. In practice, the image recording system 50 is provided with a printer module which includes a printer housing having disposed therein fixing rollers 5, a photosensitive medium 52, a charging unit 53, a laser unit 54, a toner box 56 disposed within a toner cartridge 59, a magnet roller 58 supplying toner in the toner box 56 to the photosensitive medium 52, and a transfer roller 60. The development of an image on the recording paper sheet is accomplished by placing electric charge on the photosensitive medium 52 to have the toner adhere to a charged area or a non-charged area of the photosensitive medium and transferring that toner on the recording paper sheet. The toner-transferred recording paper sheet is then pressed and heated by the fixing rollers 5 so that the toner is fixed on the recording paper sheet. The image-developed recording paper sheet is then ejected by an ejecting roller 6 to a image-recorded paper tray 7. The image-recorded paper tray 7 is mounted detachably on a recorded paper outlet.

The front openable cover 8 is pivotably supported by the housing body 1 through a support shaft 9 to be opened forward, exposing the image recording system 50.

The document feeder tray 10 is provided for stacking thereon original documents, and includes document guide plates 11 on both sides thereof for orienting the documents toward a document feeding path B. A document guide roller 12 is arranged ahead of the document feeder tray 10 to thrust some of the documents stacked on the document feeder tray 10 in engagement with the lowermost sheet of the documents while the uppermost sheet is pressed by a separating plate 13. A document supplying roller 14 engages a pinch roller 15 which is arranged downstream of the separating plate 13 in a document-feeding direction. The document supplying roller 14 rotates in contact with the lowermost sheet of the documents pressed by the separating plate 13 to supply them to an image reading station, one by one. With these arrangements, even when a large number of document sheets are stacked on the document feeder tray 10 so that leading edges thereof do not reach the document supplying roller 14, some of the document sheets on the document feeder tray 10 are carried by the document guide roller 12 to the document supplying roller 14.

In the image reading station, the document sheet is advanced by document feeding rollers 16 (see FIG. 4) along the document feeding path B. The document sheet is illuminated by a light source 17. The reflected light therefrom is then directed by two mirrors 18a and 18b toward a lens 19 so that it is focused on a photosensitive element 20 (i.e., an image sensor). The photosensitive element 20 is responsive to the incident light to provide an image signal. After passing through the image reading station, the document sheet is ejected to the transmitted document tray 21.

An image reading station cover 22 is so supported by a support shaft 23 as to be opened downward, as shown by an arrow in FIG. 2, to expose the image reading station for providing the facsimile operator with easy access thereto.

In operation, when information data, or transmitted images are received, the pick-up roller 3 rotates to pick up one recording paper sheet from the recording sheet cassette 2 disposed on the bottom of the housing body 1. The recording paper sheet is advanced upward by rotation of the feeding roller 4 along the recording paper feeding path A. Upon arriving at the image recording station, toner adheres to the recording paper sheet. The toner on the recording paper sheet is then heated by the fixing roller 5 so that received images are printed thereon. The image-recorded sheet is then ejected by the ejecting roller 6 onto the image-recorded paper tray 7. The image-recorded paper tray 7, as can be seen in FIGS. 1 and 2, projects from the central portion of an upper surface of the housing body 1 so that the presence of the image-recorded sheet thereon may easily be perceived visually if a facsimile operator is away from the facsimile machine.

When a recording paper sheet jams in the recording paper feeding path A during the recording operation, the facsimile operator may open the front openable cover 8 for access to the recording paper feeding path A. The front openable cover 8 is, as discussed above, pivotably supported by the support shaft 9 so as to expose the whole of the recording paper feeding path A for allowing the facsimile operator to easily remove a sheet even if jammed anywhere in the recording paper feeding path A.

Additionally, since the front openable cover 8 opens forward or to the operator standing in front of the facsimile transceiver, it is quite convenient for the operator to gain easy access to the recording paper feeding path A. Further, the image-recorded paper tray 7 is not arranged on a side surface of the front openable cover 8, but on the upper surface of the housing body 1, thus eliminating the need for removing it upon opening the front openable cover 8.

When transmitting the contents of a document, the facsimile operator first places document sheets to be transmitted on the document feeder tray 10 arranged behind the image-recorded paper tray 7 and then orients them in a document feeding direction using the document guide plates 11. The document sheets are then introduced by the document guide roller 12 to the document feeding path B so that a leading portion of the lowermost sheet may be advanced ahead of the others. Even when a plurality of document sheets are stacked on the document feeder tray 10, the separating plate 13 presses the uppermost sheet while the document supplying roller 14 rotates in contact with the lowermost sheet so that the document sheets are sequentially separated and fed to the document feeding path B. When a document paper sensor (as will be described hereinafter in detail) detects the first document sheet, the document guide roller 12 is stopped to assume a stand-by state until the first document sheet has passed through the image-reading station.

In the image-reading station, the document sheet being illuminated by the light source 17 is advanced by the document feeding rollers 16. The reflected light from the document sheet is directed by the mirrors 18a and 18b through the lens 19 so that it is focused on the light-sensitive element 20. The light-sensitive element 20 is responsive to the incident light to provide an image signal. After passing through the image reading station, the document sheet is ejected to the transmitted document tray 21 along the document feeding path B.

When the document sheet is jammed in the document feeding path B during the image-reading operation, the image-recorded paper tray 7 is initially removed by the operator. Since the image-recorded paper tray 7 is simply fitted into a groove 24, the removal of the image-recorded paper tray 7 is easily accomplished by lifting it upward. A latch 25 is subsequently released to rotate the image reading station cover 22 with respect to the support shaft 23 so that it opens downward to wide expose the document feeding path B. Since the document feeding path B is inclined, the entire path is exposed over a range from the document supplying roller 14 to a downstream side thereof. This enables the operator to easily remove the jammed sheet from the document feeding path B.

Figure 3:
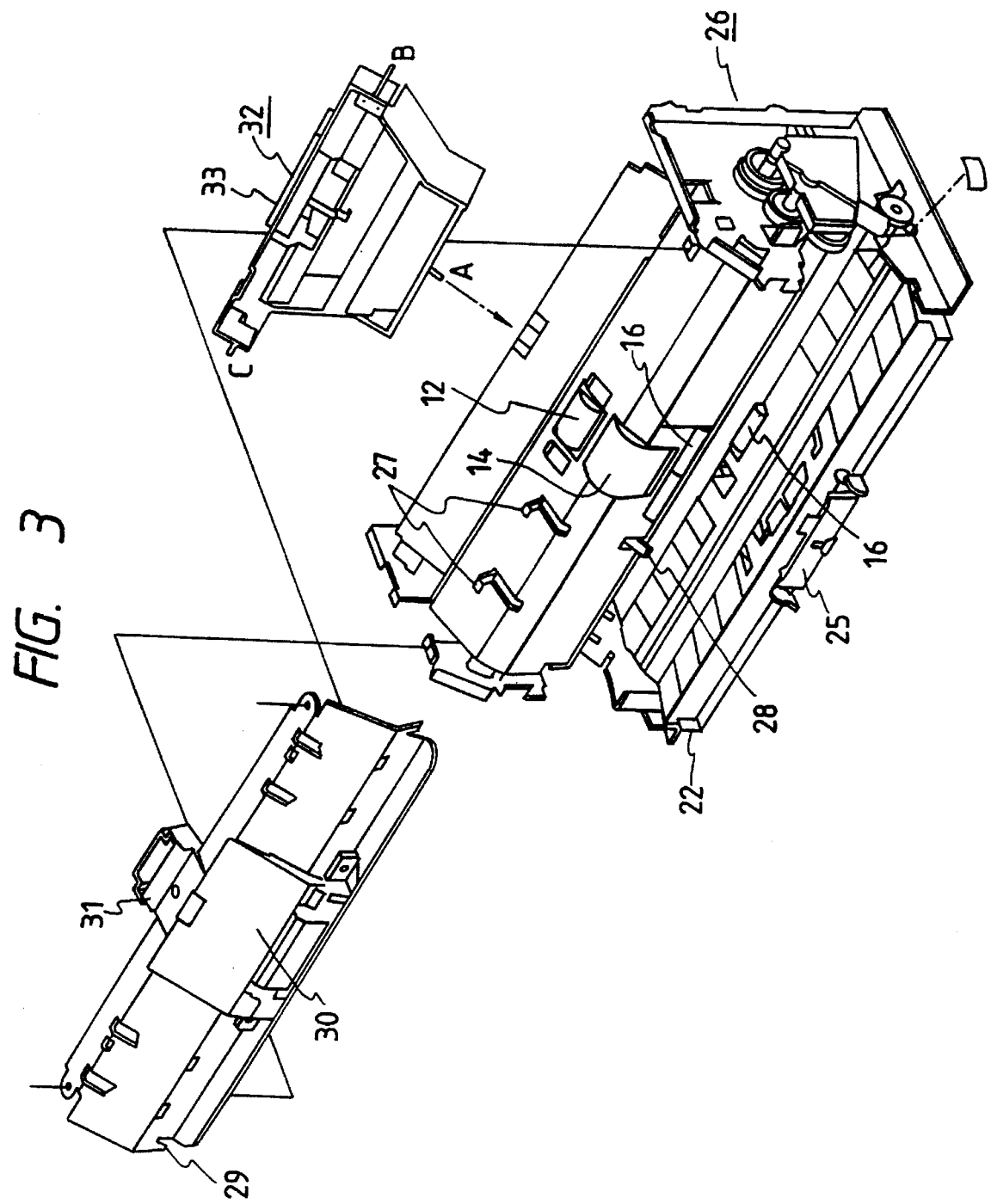
FIG. 3 is a perspective view which shows an image reading unit incorporated in a facsimile transceiver of the invention.

Referring to FIG. 3, there is shown an image reading unit 26 according to the present invention.

The image reading unit 26 includes a first document paper sensor 27 designed to detect the presence of a document and to measure the size thereof and a second document paper sensor 28 adapted to detect a leading edge of a document supplied by the document supplying roller 14. The supply of a document is monitored by the document supplying roller 14 and then the document guide roller 12 is stopped at its given position to wait for the image-reading operation of a subsequent document.

Figure 4:
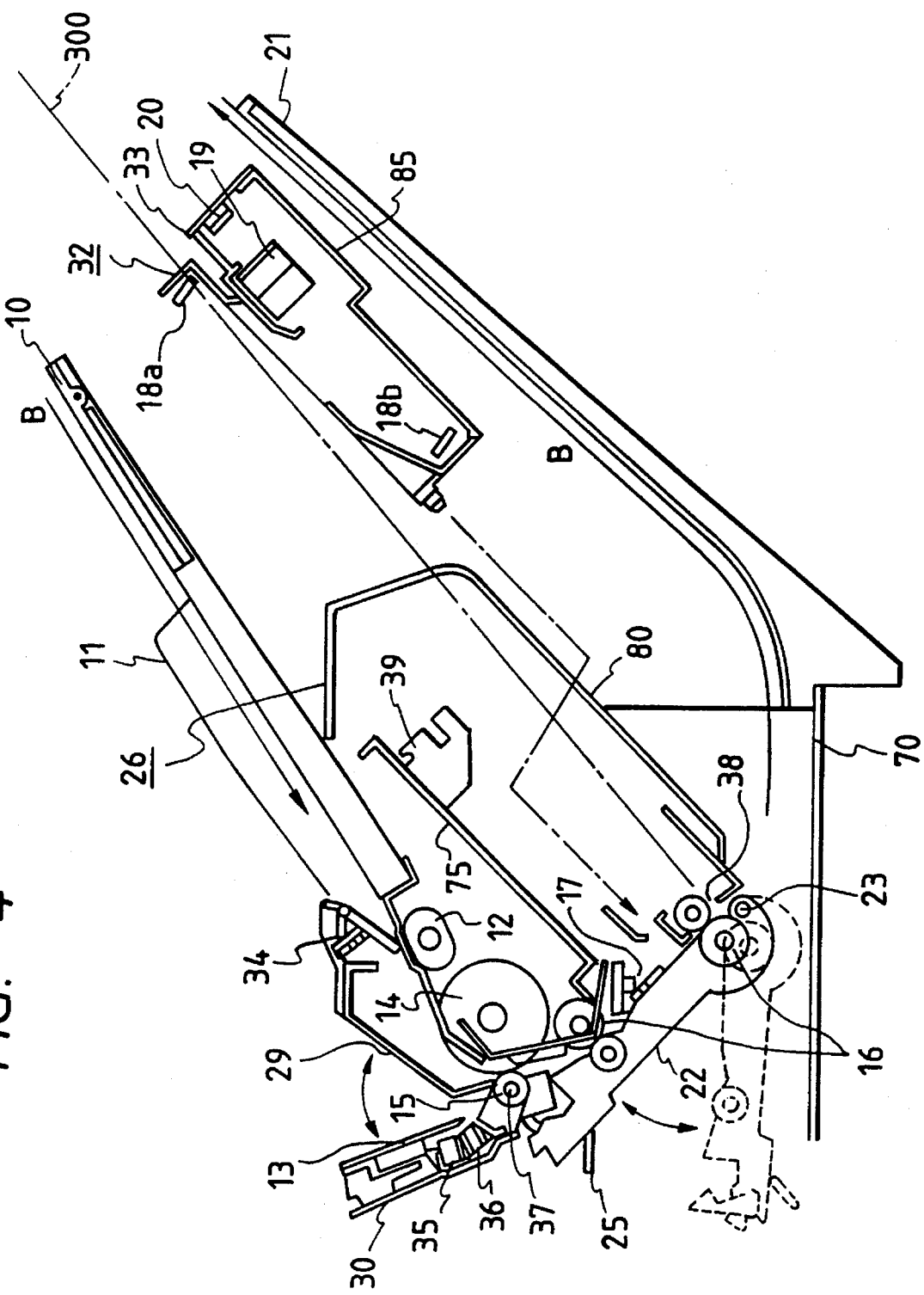
FIG. 4 is a cross-sectional view which shows an essential part of an image reading system of a facsimile transceiver of the invention.
Figure 5:
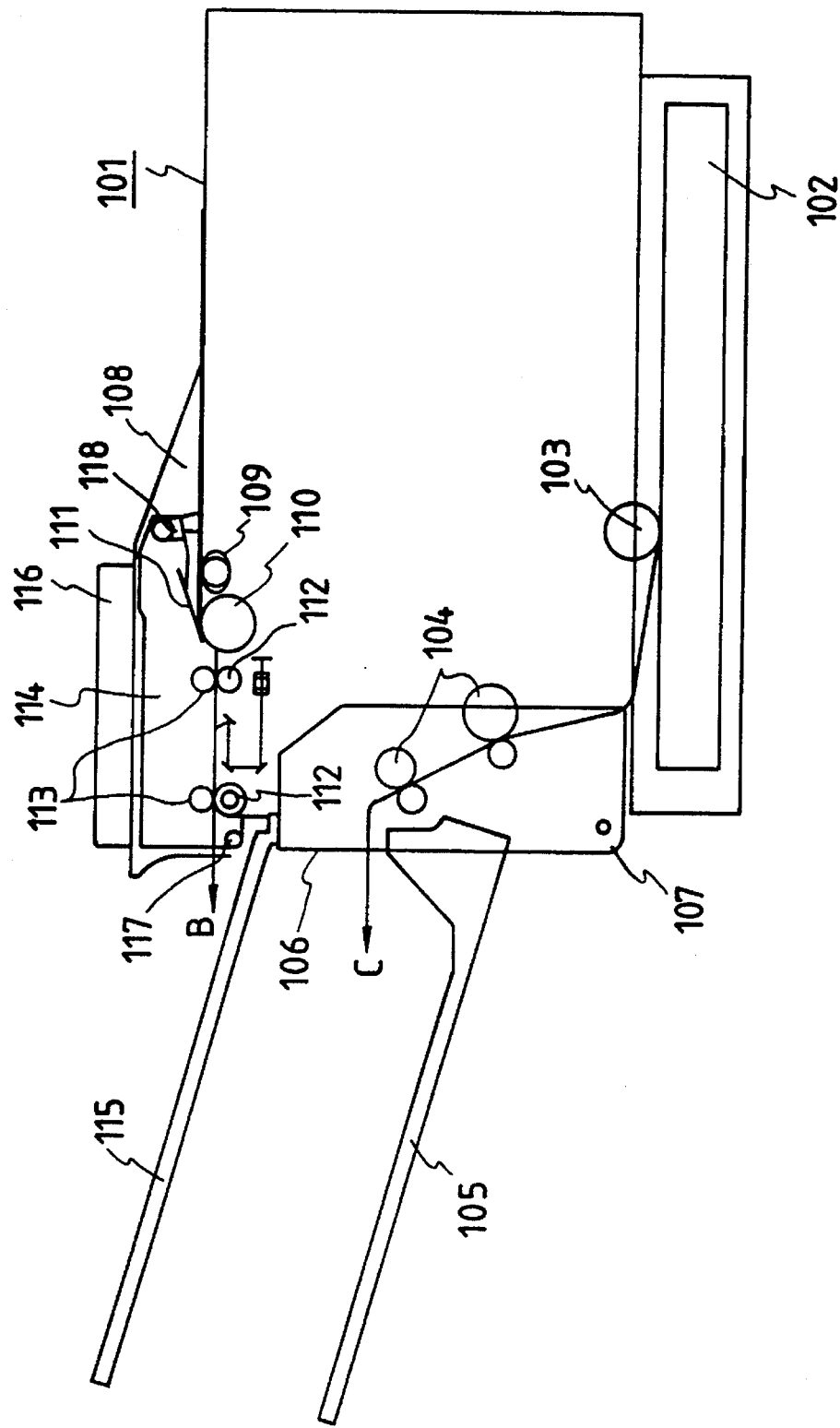
FIG. 5 is an explanatory view which shows a conventional later printer type facsimile transceiver.

A metal plate 29 is mounted on the image reading unit 26 to define a path therebetween through which a document passes. Formed on the central portion of the metal plate 29 is a sheet supplying portion cover 30. The separating plate 13, as can be seen in FIG. 4, is attached on the reverse side of the sheet supplying portion cover 30. The separating plate 13, when the sheet supplying portion cover 30 is opened, is brought into disengagement from the document supplying roller 14. A document pressing plate support member 31 projects from the metal plate 29. The document pressing plate support member 31 has disposed thereon a document pressing plate 34, as shown in FIG. 4, which is biased by a spring against the uppermost document to restrict the number of documents to be supplied and to assist in establishing tight engagement between the lowermost document and the document guide roller 12.

An optical unit 32 includes an optical unit housing 85 having disposed therein the mirrors 18a and 18b and the lens 19 and the photosensitive element 20. A mounting plate 33 is attached to the housing 85 to have disposed thereon the photosensitive element 20. The optical unit 32, as can be seen in FIGS. 3 and 4, is so retained by the image reading unit 26 using three support pins A, B, and C that an optical axis extending from the light source 17 to the mirror 18a or from the mirror 18b to the lens 19 may be oriented at given angle to the bottom of the housing body 1. In other words, upper and bottom walls 75 and 80 of a housing of the image reading unit 26, as seen in FIGS. 2 and 4, are inclined relative to an upper wall 70 of the printer housing of the image recording system 50, thereby widening the document outlet leading to the transmitted document tray 21 as approaching a downstream side of the document feeding path B. This enables the facsimile operator to easily pick up the transmitted documents from behind the housing body 1.

Referring to FIG. 4, the image reading unit 26 includes a pair of separating plate pressing members 35 and 36 which press the separating plate 13 under a preselected pressure into engagement with the document supplying roller 14. The separating plate pressing member 36 is separate from the separating plate pressing member 35 and serves to prevent irregular feeding of a trailing portion of a document sheet when leaving from between the separating plate 13 and the document supplying roller 14. The sheet supplying portion cover 30 is pivotably supported by a support shaft 30. The document supplying roller 14 is located at a predetermined distance away from the upper wall 75 of the image reading unit 26 in a direction perpendicular to the upper wall 75.

As explained above, the recording paper feeding path A extends from the lower portion to the upper portion of the housing body 1 through the front side thereof so that it occupies a relatively large amount of space in the housing body 1. Therefore, in order to reduce the size of the facsimile machine, it is necessary to arrange the document feeding path B effectively in a limited space of the housing body 1. In this embodiment, the document feeding path B is of substantially U-shape, which will however, cause a document sheet to be jammed in the document feeding path B. As long as the document feeding path B, if being of U-shape, has a relatively large radius, document sheets are almost prevented from being jammed therein. This arrangement, however, undesirably requires a large-sized image reading unit as well as a housing body.

For avoiding this drawback, in this embodiment, the document supplying roller 14 is elevated away from the lower portion of the image reading unit 26, that is, arranged away from the upper wall 75 of the image reading unit 26 in a perpendicular direction thereto to provide a greater radius of the U-shaped document feeding path B than would be the case where the document supplying roller 14 is mounted on the upper wall 70 of the printer housing. This is because since the document supplying roller 14 must be located upstream of the document feeding path B adjacent the document feeder tray 10, when the document supplying roller 14 is disposed near the lower portion of the image reading unit 26 on the upper wall 70 of the printer housing, the document feeder tray 10 needs to be lowered further to the upper wall 70 of the printer housing. This results in a decreased radius of the document feeding path B to form a sharp turn therein. On the other hands, when the document supplying roller 14 is, as explained above, located away from the upper wall 75 of the image reading unit 26 in the perpendicular direction thereto, the document feeder tray 10 may be arranged upward, thereby allowing the radius of the document feeding path B to be increased. This arrangement reduces the possibility of document sheets being jammed in the document feeding path B.

Additionally, the document feeding path B (i.e., the center line 300) is inclined to the upper wall 70 of the printer module 50. The optical unit 32 (i.e., the image reading unit 26) is likewise angled to the upper wall 70 of the printer module 50 so that space is formed therebetween, thereby widening the document outlet to allow the operator to easily take the document ejected on the transmitted document tray 21. Further, the bottom wall 80 of the image reading unit 26 is inclined upwardly so that the depth of the housing body 1 may be decreased. Thus, the operator may easily take ejected documents without having to get behind the facsimile transceiver.

When a document sheet jammed in the document feeding path B is removed, the image-recorded paper tray 7 is first taken off and then the latch 25 is released to open the image reading station cover 22 so that a portion of the document feeding path B downstream of the document supplying roller 14 is exposed, thus allowing the operator to easily put his or her hand into the document feeding path B for removal of the jammed document. Additionally, when the jammed document is tightly caught between the separating plate 13 and the document supplying roller 14, making it difficult to remove it, the removal of the jammed document is easily accomplished by opening the sheet supplying portion cover 30 to release compression between the separating plate 13 and the document supplying roller 14. It will be noted that the provision of the sheet supplying portion cover 30 separate from the image reading station cover 22 eliminates the need for releasing the compression between the separating plate 13 and the document supplying roller 14 when a document sheet is jammed in the document feeding path B.

In addition, even when frequent opening and closing movements of the image reading station cover 22 cause compression force between the document feeding rollers 16 and pinch roller engaging them to act on the resin-made image reading station cover 22 leading to deformation thereof, it does not affect the pressing of the separating plate 13 against the document supplying roller 14 so that the ability of the separating plate 13 an, the document supplying roller 14 to form a nip, through which a document sheet is fed, is maintained constant.

The sheet supplying portion cover 30, as shown in FIG. 3, is provided on the central portion of the metal plate 29 as to form an opening only required for releasing the engagement between the separating plate 13 and the document supplying roller 14. In order to maintain the degree of engagement between the separating plate 13 and the document supplying roller 14 constant, it is advisable that the separating plate 13 be attached directly to the metal plate 29 without providing the sheet supplying portion cover 30. However, since the separating plate 13 and the document supplying roller 14 may catch therein a document sheet, making it difficult to remove the jammed sheet therefrom, the size of the opening closed by the sheet supplying portion cover 30 is preferably kept to a minimum sufficient for releasing the engagement between the separating plate 13 and the document supplying roller 14. This prevents the degree of engagement between the separating plate 13 and the document supplying roller 14 from changing due to frequent opening and closing motion of the sheet supplying portion cover 30.

In a conventional facsimile machine, a latch is commonly provided on both sides of an openable cover because a document sheet passes through the central portion thereof. However, in this embodiment, the latch 25 is installed on the center of the image reading station cover 22. This arrangement becomes possible by separating the sheet supplying portion cover 30 from the image reading station cover 22. Since the latch 25 secured on the image reading station cover 22 is engageble with a support portion pivotably supporting the sheet supplying portion cover 30, the latch 25, although arranged on the central portion of the image reading station cover 22, does not interfere with the feeding of document sheets along the document feeding path B. Additionally, the arrangement of the latch 25 provided on the central portion of the image reading station cover 30 increases the rigidity of the image reading station cover 22 withstanding the pressure of the document feeding rollers 16 acting on the pinch rollers engaging them for the following reasons. The document feeding rollers 16 and the pinch rollers engaging them are arranged on the center line of the image reading station cover 22 along the document feeding path B, causing loads created by the pressures between the document feeding rollers 16 and the pinch rollers to act on the central area of the image reading station cover 22. This can lead to deformation of the image reading station cover 22 with the result being that the document feeding rollers 16 are displaced out of engagement with the pinch rollers, causing irregular feeding of document sheets. However, since the latch 25 is arranged on the central portion of the image reading station cover 22 along a line extending through the document feeding rollers 16, and tightly engages the image reading unit 26 to withstand the pressures between the document feeding rollers 16 and the pinch rollers engaging therewith, an interval between the image reading station cover 22 and the image reading unit 26 is maintained constant, thereby preventing the image reading station cover 22 from being curved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A facsimile apparatus comprising:

a housing body;

a paper storage member for storing therein a stack of recording paper sheets, said paper storage member being disposed in a lower portion of said housing body;

printing means for printing an image on the recording paper sheet;

a recorded image outlet formed in an upper surface of said housing body;

paper feeding means for feeding the recording paper sheets, in sequence, to said recorded image outlet through said printing means along a feeding path extending from said paper storage member to said recorded image outlet through a side wall of said housing body; and a plurality of paper directing stations, the facsimile apparatus being free of paper directing stations for redirecting a path of the recording paper sheet by an angle substantially in excess of 90° thereby avoiding any U-shaped portions in said feeding path.

2. A facsimile apparatus as set forth in claim 1 wherein said plurality of paper directing stations include a paper retrieving station for retrieving a recording paper sheet from said paper storage member and for directing the retrieved sheet to said feeding path at a predetermined angle, and wherein each of said plurality of paper directing stations other than said paper retrieving station redirects the recording paper sheet by a small angle less than or equal to an angle of substantially 45°.

3. A facsimile apparatus comprising:

a housing body;

a paper storage member for storing therein a stack of recording paper sheets, said paper storage member being arranged on a lower portion of said housing body;

printing means for printing an image on the recording paper sheet;

a recorded image outlet formed in an upper surface of said housing body;

paper feeding means for feeding the recording paper sheets, in sequence, to said recorded image outlet through said printing means along a feeding path extending from said paper storage member to said recorded image outlet through a side wall of said housing body;

a front cover disposed at the front side of said housing body along substantially an entire portion of the feeding path so as to be opened for exposing substantially the entire portion of the feeding path;

reading means for reading contents of a document, said reading means being arranged above said printing means;

a U-shaped document feeding path and a document supplying roller;

the document feeding path extending from a document inlet formed in the upper surface of said housing body to a document outlet formed in a rear surface of said housing body;

the document supplying roller supplying the document to said reading means along the U-shaped document feeding path;

said printing means being provided with a printer module disposed in a printer housing arranged on said paper storage member, the printer housing having an upper wall extending to the document outlet;

said reading means being disposed in a housing arranged inside the U-shaped document feeding path, the housing having upper and lower walls inclined to the upper wall of the printer housing at a preselected angle;

said reading means having disposed therein an optical system with an optical axis inclined at a given angle to the bottom of said housing body;

the document supplying roller being located at a preselected distance away from the upper wall of the housing of said reading means in a direction perpendicular to the upper wall of the housing.

4. A facsimile apparatus comprising:

a housing body;

a paper storage member for storing therein a stack of recording paper sheets, said paper storage member being disposed in a lower portion of said housing body;

printing means for printing an image on the recording paper sheet;

a recorded image outlet formed in an upper surface of said housing body;

paper feeding means for feeding the recording paper sheets, in sequence, to said recorded image outlet through said printing means along a feeding path extending from said paper storage member to said recorded image outlet through a side wall of said housing body;

a document inlet formed in the upper surface of said housing body for introducing the document into said housing body;

a document outlet formed in a side wall of said housing body for ejecting the document outside said housing body;

a U-shaped document feeding path extending from said document inlet to said document outlet, said U-shaped document feeding path having a radius which increases as the document feeding path approaches said document outlet; and reading means for reading contents of a document;

said reading means having an optical system with an optical axis being arranged opposite said printing means across said U-shaped document feeding path and inclined at a given angle to the bottom of said housing body.

5. A facsimile apparatus as set forth in claim 4, wherein said printing means is provided with a printer module disposed in a printer housing arranged on said paper storage member, the printer housing having an upper wall extending to a side wall of said housing body, the document outlet being defined be%ween the upper wall of the printer housing and said reading means and being so designed as to widen as approaching a downstream side of the U-shaped document feeding path.

6. A facsimile apparatus as set forth in claim 5, wherein the U-shaped document feeding path has a portion downstream of a center line thereof greater in radius than a portion upstream of the center line.

7. A facsimile apparatus as set forth in claim 4, wherein said printing means is provided with a printer module disposed in a printer housing arranged on said paper storage member, the printer housing having an upper wall extending to a side wall of said housing body, the optical system being disposed in an optical system housing having a bottom wall, the document outlet being defined between the upper wall of the printer housing and the bottom wall of the optical system housing, the optical system housing being so arranged that the bottom wall thereof is inclined to the upper wall of the printer housing at a predetermined angle to widen the document outlet as approaching a downstream side of the document feeding path.

8. A facsimile apparatus comprising:

a housing body;

a paper storage member for storing therein a stack of recording paper sheets, said paper storage member being disposed in a lower portion of said housing body;

printing means for printing an image on the recording paper sheet;

a recorded image outlet formed in an upper surface of said housing body;

paper feeding means for feeding the recording paper sheets, in sequence, to said recorded image outlet through said printing means along a feeding path extending from said paper storage member to said recorded image outlet through a side wall of said housing body;

a document inlet formed in the upper surface of said housing body for introducing the document into said housing body;

a document outlet formed in a side surface of said housing body for ejecting the document outside said housing body;

a U-shaped document feeding path extending from the document inlet to the document outlet;

reading means for reading contents of a document; and a document supplying roller supplying the document to said reading means along the U-shaped document feeding path;

wherein said printing means is provided with a printer module disposed in a printer housing arranged on said paper storage member, the printer housing having an upper wall extending to the document outlet;

wherein said reading means is disposed in a housing arranged inside the U-shaped document feeding path, the housing having upper and lower walls inclined to the upper wall of the printer housing at a preselected angle; and wherein the document supplying roller is located at a preselected distance away from the upper wall of the housing of said reading means in a direction perpendicular to the upper wall of the housing.

9. A facsimile apparatus comprising:

a housing body;

a paper storage member for storing therein a stack of recording paper sheets, said paper storage member being arranged in a lower portion of said housing body;

printing means for printing an image on the recording paper sheet;

an image-printed paper tray for storing the image-printed recording paper sheet, said image-printed paper tray projecting from an upper wall of said housing body;

paper feeding means for sequentially feeding the recording paper sheets to said image-printed paper tray through said printing means along a feeding path extending from said paper storage member to said image-printed paper tray;

a document feeder tray mounted on the upper wall of said housing body;

reading means for reading contents of a document fed from said document feeder tray;

document feeding means for feeding the document along a document feeding path extending from said document feeder tray to said reading means;

a reading means cover member arranged to expose said reading means and the document feeding means;

document supplying means for supplying the document from said document feeder tray to said document feeding means; and a document supplying means cover for covering said document supplying means, wherein said document feeding means includes a document feeding roller arranged along the document feeding path, and wherein said reading means cover is held by the document supplying means cover through a latch, the latch being provided on a portion of the document supplying means cover facing the document feeding roller.

10. A facsimile apparatus comprising:

a housing body;

a paper storage member for storing therein a stack of recording paper sheets, said paper storage member being arranged in a lower portion of said housing body;

a recorded image outlet formed in an upper surface of said housing body;

a feeding path extending within said housing body from said paper storage member to said recorded image outlet through a first side wall of said housing body to define a given space between said feeding path and a second side wall of said housing body opposite the first side wall;

printing means for printing an image on the recording paper sheet, said printing means being disposed within the given space defined between said feeding path and the second side wall of said housing body;

paper feeding means for feeding the recording paper sheets in sequence to said recorded image outlet through said printing means along said feeding path;

an image-printed paper tray for storing the image-printed recording paper sheet, said image-printed paper tray projecting from an upper wall of said housing body;

a document feeder tray mounted on the upper wall of said housing body;

reading means for reading contents of a document fed from said document feeder tray;

a transmitted document tray mounted on the second side wall of said housing body; and a U-shaped document feeding path extending from said document feeder tray to said transmitted document tray through said reading means, wherein said reading means is arranged opposite said printing means across said U-shaped document feeding path.

11. A facsimile apparatus as set forth in claim 10, further comprising document feeding means for feeding the document along a document feeding path extending from said document feeder tray to said reading means, a reading means cover member arranged to expose said reading means and the document feeding means;

a document supplying means for supplying the document from said document feeder tray to said document feeding means, and a document supplying means cover for covering said document supplying means, wherein said document feeding means includes a document feeding roller arranged along the document feeding path, said reading means cover being held by the document supplying means cover through a latch, the latch being provided on a portion of the document supplying means cover facing the document feeding roller.

12. A facsimile apparatus comprising:

a housing body;

a paper storage member for storing therein a stack of recording paper sheets said paper storage member being disposed in a lower portion of said housing body detachably from a side wall of said housing body;

printing means for printing an image on the recording paper sheet;

a recorded image outlet formed in an upper surface of said housing body;

paper feeding means for feeding the recording paper sheets, in sequence, to said recorded image outlet through said printing means along a feeding path extending from said paper storage member to said recorded image outlet through the side wall of said housing body; and a front cover member arranged to be opened to expose the feeding path, said front cover member including first and second surfaces, said first surface covering a front portion of said housing body;

said second surface covering an upper portion of said housing body;

wherein said feeding path extends substantially linearly and free of U-shaped portions at said front and upper portions of said housing body.

13. A facsimile apparatus as set forth in claim 12, wherein said front cover member is disposed at the front side of said housing body along substantially an entire portion of the feeding path, said front cover member arranged for opening to expose substantially an entirety of the feeding path.

* * * * *